(12) United States Patent
Guler et al.

(10) Patent No.: US 12,169,975 B2
(45) Date of Patent: Dec. 17, 2024

(54) SCENE RECONSTRUCTION IN THREE-DIMENSIONS FROM TWO-DIMENSIONAL IMAGES

(71) Applicant: Snap Inc., Santa Monica, CA (US)

(72) Inventors: Riza Alp Guler, London (GB);
Georgios Papandreou, London (GB);
Iason Kokkinos, London (GB)

(73) Assignee: SNAP INC., Santa Monica, CA (US)

( * ) Notice: Subject to any disclaimer, the term of this patent is extended or adjusted under 35 U.S.C. 154(b) by 398 days.

(21) Appl. No.: 17/596,697

(22) PCT Filed: Jun. 17, 2020

(86) PCT No.: PCT/EP2020/066831
§ 371 (c)(1),
(2) Date: Dec. 16, 2021

(87) PCT Pub. No.: WO2020/254448
PCT Pub. Date: Dec. 24, 2020

(65) Prior Publication Data
US 2022/0358770 A1 Nov. 10, 2022

Related U.S. Application Data

(60) Provisional application No. 62/862,139, filed on Jun. 17, 2019.

(51) Int. Cl.
*G06V 20/64* (2022.01)
*G06T 7/73* (2017.01)
(Continued)

(52) U.S. Cl.
CPC .............. *G06V 20/647* (2022.01); *G06T 7/73* (2017.01); *G06V 10/806* (2022.01); *G06V 10/82* (2022.01);
(Continued)

(58) Field of Classification Search
CPC .... G06V 20/647; G06V 10/806; G06V 10/82; G06V 2201/07; G06T 7/73;
(Continued)

(56) References Cited

U.S. PATENT DOCUMENTS

2015/0062120 A1* 3/2015 Reisner-Kollmann ..................... G06T 19/006 345/419
2019/0138786 A1* 5/2019 Trenholm .............. G06F 18/241
(Continued)

FOREIGN PATENT DOCUMENTS

CN 114026599 2/2022
WO WO-2020254448 A1 12/2020

OTHER PUBLICATIONS

G. Rogez, P. WeinzaepfelandC.Schmid,"LCR-Net++:Multi-Person2Dand3DPoseDetectioninNaturalImages," inIEEE TransactionsonPatternAnalysisandMachineIntelligence,vol. 42,No. 5,pp. 1146-1161, May 1, 2020,doi:10.1109/TPAMI.2019.2892985 (Year: 2019).*
(Continued)

*Primary Examiner* — Ping Y Hsieh
*Assistant Examiner* — Vaisali Rao Koppolu
(74) *Attorney, Agent, or Firm* — SCHWEGMANLUNDBERG & WOESSNER, P.A.

(57) ABSTRACT

This specification relates to reconstructing three-dimensional (3D) scenes from two-dimensional (2D) images using a neural network. According to a first aspect of this specification, there is described a method for creating a three-dimensional reconstruction of a scene with multiple objects from a single two-dimensional image, the method comprising: receiving a single two-dimensional image; identifying all objects in the image to be reconstructed and identifying the type of said objects; estimating a three-dimensional representation of each identified object; estimating a three-dimensional plane physically supporting all three-dimen-
(Continued)

sional objects; and positioning all three-dimensional objects in space relative to the supporting plane.

15 Claims, 6 Drawing Sheets

(51) Int. Cl.
  *G06V 10/80* (2022.01)
  *G06V 10/82* (2022.01)
(52) U.S. Cl.
  CPC ............... *G06T 2207/20084* (2013.01); *G06V 2201/07* (2022.01)
(58) Field of Classification Search
  CPC . G06T 2207/20084; G06T 2207/10016; G06T 2207/20081; G06T 2207/30196; G06T 17/00; G06T 7/50
  See application file for complete search history.

(56) References Cited

U.S. PATENT DOCUMENTS

| | | | | |
|---|---|---|---|---|
| 2020/0111250 | A1* | 4/2020 | Huang | G06T 17/00 |
| 2020/0167990 | A1* | 5/2020 | Wu | G06V 40/174 |
| 2021/0103776 | A1* | 4/2021 | Jiang | G06T 19/20 |

OTHER PUBLICATIONS

T. Hassner and R. Basri, "Example Based 3D Reconstruction from Single 2D Images," 2006 Conference on Computer Vision and Pattern Recognition Workshop (CVPRW'06), New York, NY, USA, 2006, pp. 15-15, doi: 10.1109/CVPRW.2006.76 (Year: 2006).*
"International Application Serial No. PCT/EP2020/066831, International Preliminary Report on Patentability mailed Dec. 30, 2021", 10 pgs.
Chen, Liang-Chieh, "DeepLab: Semantic Image Segmentation with Deep Convolutional Nets, Atrous Convolution, and Fully Connected CRFs", arXiv:1606.00915v2 [cs.CV], (May 12, 2017), 14 pgs.
Long, Jonathan, "Fully Convolutional Networks for Semantic Segmentation", IEEE Conference on Computer Vision and Pattern Recognition (CVPR), Boston, MA, (Jun. 2015), 10 pgs.
Pernici, Federico, "Memory Based Online Learning of Deep Representations from Video Streams", Proceedings of the IEEE Conference on Computer Vision and Pattern Recognition, (2018), 2324-2334.
Zhang, Xiang, "OverFeat: Integrated Recognition, Localization and Detection using Convolutional Networks", arXiv:1312.6229v4 [cs.CV], (Feb. 24, 2014), 16 pgs.
"International Application Serial No. PCT/EP2020/066831, International Search Report mailed Aug. 11, 2020", 5 pgs.
"International Application Serial No. PCT/EP2020/066831, Written Opinion mailed Aug. 11, 2020", 5 pgs.
Guler, Riza Alp, et al., "HoloPose: Holistic 3D Human Reconstruction In-The-Wild", CVPR, (Jun. 20, 2019), 10884-10894.
Rogez, Gregory, et al., "LCR-Net++: Multi-person 2D and 3D Pose Detection in Natural Images", [Online] Retrieved from the Internet: <URL: https://arxiv.org/abs/1803.00455>, (Mar. 1, 2018), 15 pgs.
"Korean Application Serial No. 10-2022-7001123, Notice of Preliminary Rejection mailed Nov. 20, 2023", w/ English Translation, 20 pgs.
"Korean Application Serial No. 10-2022-7001123, Response filed Jan. 17, 2024 to Notice of Preliminary Rejection mailed Nov. 20, 2023", w/ English Claims, 28 pgs.
Tome, Denis, et al., "Lifting from the Deep: Convolutional 3D Pose Estimation from a Single Image", Proceedings of the IEEE Conference on Computer Vision and Pattern Recognition, (2017), 10 pgs.
"European Application Serial No. 20733942.5, Communication Pursuant to Article 94(3) EPC mailed May 10, 2024", 6 pgs.
"Korean Application Serial No. 10-2022-7001123, Notice of Preliminary Rejection mailed Apr. 30, 2024", w/ English translation, 7 pgs.
"Korean Application Serial No. 10-2022-7001123, Response filed Jun. 18, 2024 to Notice of Preliminary Rejection mailed Apr. 30, 2024", w/ current English claims, 13 pgs
"European Application Serial No. 20733942.5, Response filed Jul. 17, 2024 to Communication Pursuant to Article 94(3) EPC mailed May 10, 2024", 15 pgs.

* cited by examiner

SCENE RECONSTRUCTION IN THREE-DIMENSIONS FROM TWO-DIMENSIONAL IMAGES

CLAIM OF PRIORITY

This application is a U.S. national-phase application filed under 35 U.S.C. § 371 from International Application Serial No. PCT/EP2020/066831, filed on Jun. 17, 2020, and published as WO 2020/254448 on Dec. 24, 2020, which claims the benefit of priority to U.S. Provisional Application Ser. No. 62/862,139, filed on Jun. 17, 2019, each of which are incorporated herein by reference in their entireties.

FIELD

This specification relates to reconstructing three-dimensional (3D) scenes from two-dimensional (2D) images using a neural network.

BACKGROUND

Apart from the easier problem of faces, hardly any work exists for integrating the 3D human body (or other objects) in real-time into augmented reality applications. Bodies are generally harder than faces due to their articulated deformations, multiple occlusions and self-occlusions, complicated interactions with other objects and persons and broader appearance variability due to clothing.

Human pose estimation algorithms typically aim at localizing certain sparse points in images, such as skeleton joints and facial landmarks, or more recently dense, surface level coordinates. Despite their growing accuracy, such representations fall short of serving downstream applications like augmented reality, motion capture, gaming, or graphics. These require access to the underlying human body surface in three dimensions and currently resort to either multi-camera setups or depth sensors.

Work on morphable models has demonstrated that one can perform accurate monocular surface reconstruction by using a low dimensional parametric of the face surface and appearance, and casting the reconstruction task as an optimization problem. Extending this to the more complicated, articulated structure of the human body, monocular human body reconstruction has been studied extensively in the previous decade in conjunction with part-based representations, sampling-based inference, spatio-temporal inference and bottom-up/top-down methods. Monocular 3D reconstruction has witnessed a renaissance in the context of deep learning for both general categories and for humans in particular. Previous works rely on an efficient parameterisation of the human body in terms of skinned linear models and in particular the Skinned Multi-Person Linear (SMPL) model. Exploiting the fact that the SMPL model provides a low-dimensional, differentiable representation of the human body, these works have trained systems to regress model parameters by minimizing a re-projection error between SMPL-based 3D key points and 2D joint annotations, human segmentation masks and 3D volume projections or even refining to the level of body parts.

In parallel, 3D human joint estimation has seen a dramatic rise in accuracy by passing from classic, structure-from-motion approaches to 3D convolutional neural network (CNN)-based architectures that directly localize 3D joints in a volumetric output space through hybrids of classification and regression.

Finally, recent work on Dense Pose estimation has shown that one can estimate dense correspondences between RGB images and an SMPL model by training a generic, bottom-up detection system to associate image pixels with surface-level UV coordinates. It should be noted that even though DensePose establishes a direct link between images and surfaces, it does not uncover the underlying 3D geometry, but rather gives a strong hint about it. Other recent work relies on a parametric human model of shape, like SMPL, that allows one to describe the 3D human body surface in terms of a low-dimensional parameter vector. Most of these works train a CNN to regress the deformable model parameters, and update them in a recurrent and time-demanding optimization process.

SUMMARY

According to a first aspect of this specification, there is described a method for creating a three-dimensional reconstruction of a scene with multiple objects from a single two-dimensional image, the method comprising: receiving a single two-dimensional image; identifying all objects in the image to be reconstructed and identifying the type of said objects; estimating a three-dimensional representation of each identified object; estimating a three-dimensional plane physically supporting all three-dimensional objects; and positioning all three-dimensional objects in space relative to the supporting plane.

The step of estimating the three-dimensional representation may be performed in a deep machine-learning model that includes an output layer and one or more hidden layers that each apply a non-linear transformation to a received input to generate an output. The deep machine-learning model predicts three-dimensional landmark positions of multiple objects by concatenating feature data from one or more intermediate layers of the neural network and the predicted three-dimensional positions are estimated simultaneously for the predicted type of object depicted in each region.

The step of estimating the plane supporting multiple objects may be performed for a single frame by using the estimated three-dimensional positions of all visible objects to reconstruct the two-dimensional plane that passes through them. The step of estimating the plane supporting multiple objects may be performed for a sequence of frames using relative camera pose estimation and plane localization using correspondences between points of consecutive frames.

The receiving may further comprise receiving a plurality of images, wherein the steps of estimating the three-dimensional representations of multiple objects and positioning them on a place are done for each received image, for example in real-time. The processing may take place over multiple consecutive frames by combining the hidden layer responses at consecutive frames for example by averaging them.

Digital graphics objects may be synthetically added to the three-dimensional scene reconstruction, in a given relation to the estimated three-dimensional object positions, and then projected back to the two-dimensional image.

According to a further aspect of this specification, there is described a computation unit for creating a three-dimensional reconstruction of a scene with multiple objects from a single two-dimensional image, the computation unit comprising a memory, and at least one processor, wherein at least one processor is configured to perform a method according to the first aspect.

According to a further aspect of this specification, there is described a computer readable medium that stores a set of instructions that is executable by at least one processor of a computation unit for creating a three-dimensional reconstruction of a scene with multiple objects from a single two-dimensional image, to cause the computation unit to perform a method according to the first aspect.

According to a further aspect of this specification, there is described a computer program product comprising instructions which, when executed by a computer, cause the computer to carry out a method according to the first aspect.

According to an additional aspect of this specification, there is described a method for training a deep machine-learning model to create a three-dimensional reconstruction of a scene with multiple objects from a single two-dimensional image, the method comprising: receiving a single two-dimensional image; obtaining a training signal for three-dimensional reconstruction through adaptation of a three-dimensional model of an object to the two-dimensional image; using the resulting three-dimensional model fitting results as the supervision signal for the training of the deep machine learning model The step of fitting the three-dimensional model may be performed by projecting a three-dimensional representation on to a two-dimensional image plane resulting in a projected representation; comparing respective positions of the projected representation with the object in the single two-dimensional image; measuring an error value based on comparing; and adjusting parameters of the fused three-dimensional representation based on the error value, wherein the comparing, measuring and adjusting are repeated iteratively until a threshold condition is satisfied. The threshold condition may be the measured error value falling below a predetermined threshold value or a threshold number of iterations being surpassed. The step of projecting may be performed by taking into account the effects of perspective projection and by exploiting multiple views of the same object, if multiple views are available.

According to a further aspect of this specification, there is described a computation unit for creating a three-dimensional reconstruction of a scene with multiple objects from a single two-dimensional image, the computation unit comprising a memory, and at least one processor, wherein at least one processor is configured to perform a according to the additional aspect.

According to a further aspect of this specification, there is described a computer readable medium that stores a set of instructions that is executable by at least one processor of a computation unit for creating a three-dimensional reconstruction of a scene with multiple objects from a single two-dimensional image, to cause computation unit to perform a method according to the additional aspect.

According to a further aspect of this specification, there is described a computer program product comprising instructions which, when the executed by a computer, cause the computer to carry out a method according to the additional aspect.

According to a further aspect of this specification, there is described a system for providing a three-dimensional reconstruction of a scene with multiple objects from a single two-dimensional image, the system comprising: a first computation unit for performing any of the methods of the first aspect; and a second computation unit configured to perform a method according to the additional aspect, wherein the second unit is configured to train a model with the results of the first computation unit.

BRIEF DESCRIPTION OF THE DRAWINGS

Embodiments and examples will be described with reference to the accompanying drawings, in which.

DETAILED DESCRIPTION

Figure 1:
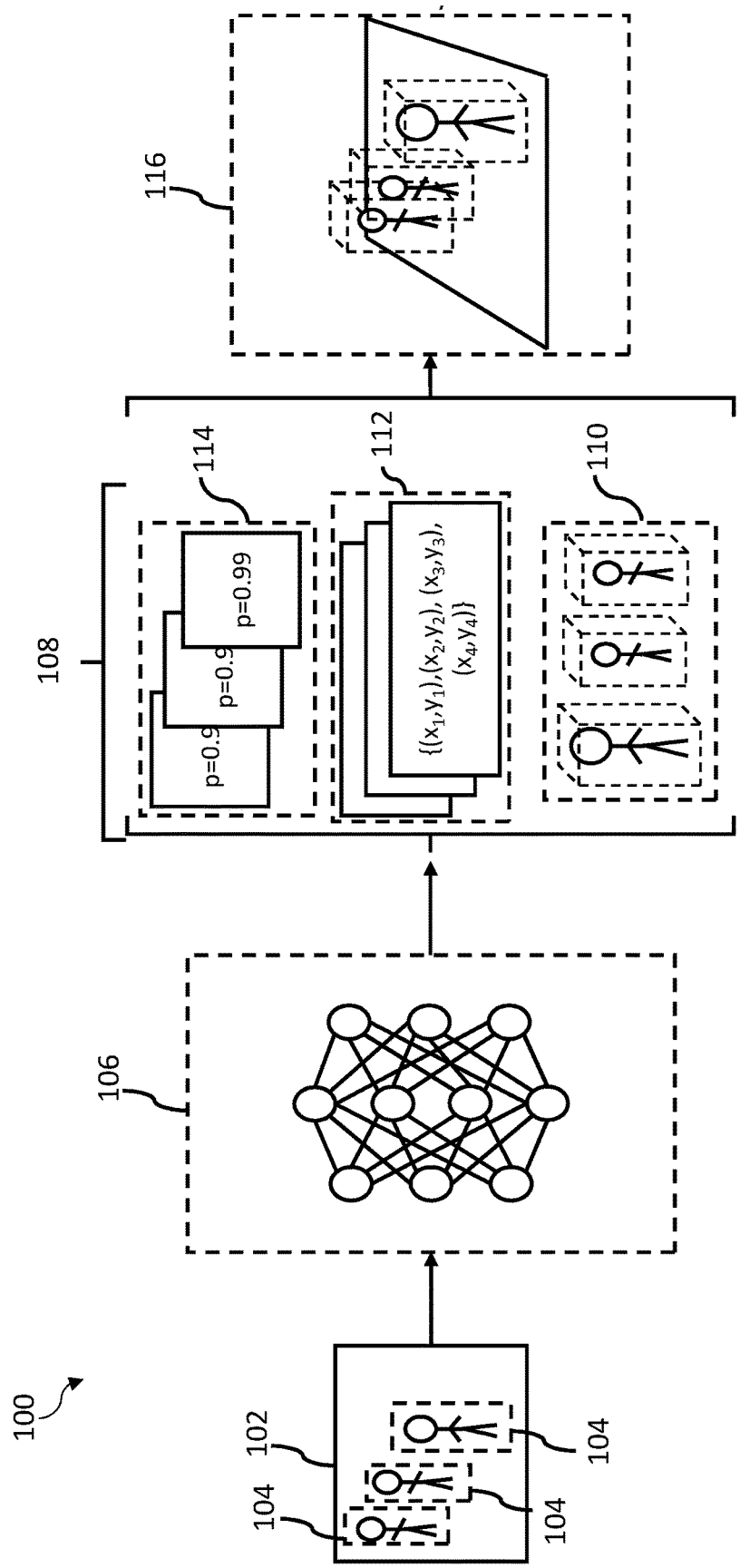
FIG. 1 shows a schematic overview of an example method for creating a three-dimensional reconstruction of a scene with multiple objects from a single two-dimensional image.

This specification describes methods and systems for the reconstruction of a 3D scene containing multiple objects (e.g. humans) from a single 2D image (e.g. an RGB image). Example methods and systems described herein can recover accurate 3D reconstructions of multiple objects at more than 30 frames per second on a mobile device (e.g. mobile phone), while also recovering information about 3D camera position and world coordinates. The methods and systems described herein may be applied to real-time augmented reality applications that involve, for example, the whole human body, allowing users to control objects positioned on them, e.g. graphics assets attached to their hands, while also allowing objects to interact with humans, e.g. balls bouncing back from humans once they contact their body.

Furthermore, this specification describes CNN design choices that allow for the estimation of the 3D shape of multiple (potentially hundreds of) objects (e.g. humans) at more than 30 frames per second on a mobile device. Using the methods described herein, results can be obtained in a constant time of around 30 milliseconds per frame on a SnapDragon 855 Neural Processing Unit (NPU), regardless of the number of objects (e.g. persons) in a scene.

Several aspects described herein may contribute to these effects, either alone or in combination.

In some embodiments, network distillation is used to construct a supervision signal for monocular image reconstruction. A detailed, time-demanding model fitting procedure is performed offline to recover a 3D interpretation of all images in a training set. The fitting results are then used for training one or more neural networks (e.g. convolutional neural networks) to efficiently process incoming test images with a single, feedforward pass through the network. This allows the incorporation of intricate constraints imposed by complementary ground-truth signals during the model fitting (e.g. region alignment, sparse and dense re-projection error based on key points and dense-pose respectively, etc.), without harming speed at test-time.

In some embodiments, an efficient encoder-only neural network architecture is used for monocular three-dimensional human pose estimation. Earlier works have relied on parametric, rigged models of the human surface, and decoder based networks for exhaustive, accurate localization of human joints in 2D. Instead a re-purposed (standard) deep neural networks used for image classification can be used, configured so that the last layer outputs 3D coordinates for each vertex of an object (e.g. human) mesh. This can substantially accelerate test-time inference, and also makes it straightforward to deploy the networks on mobile devices.

In some embodiments, the neural network may have a single-stage, fully-convolutional architecture that densely processes an input 2D image and emits 3D pose estimates for a multitude of image positions in a single pass through the (standard) convolutional network. This can result in inference being time independent of the number of objects (e.g. persons) in the scene, while also simplifying drastically the smoothing of the 3D reconstructions over time, since one can average network layers over time, instead of doing the smoothing post-hoc.

In some embodiments, a person-based self-calibration method is used that estimates the floor position in a three-dimensional scene by fitting a plane to the estimated 3D positions of objects/sub-objects (e.g. human feet) in the 2D image. This allows for the recovery of the world geometry in a manner that undoes the scaling effects of perspective projection, while also recovering camera position with respect to the plane. In turn, recovering world geometry allows for the augmentation of the recovered scene by inserting objects that can, for instance, fall on the floor and bounce back while respecting the laws of physics. The method can operate both when the camera is static, where Simultaneous Localization and Mapping (SLAM) methods fail, and also for cases where the camera moves, e.g. by aligning the estimated floor position with planes recovered by SLAM.

In some embodiments, a distributed, part-based variant of this approach gathers information about the mesh parts from multiple image positions, as indicated by the estimated object part positions. The body mesh is obtained by composing together the part-level meshes output by a neural network, thereby allowing a better handle occlusions, large articulations, while retaining the exact same memory and computation costs, apart from memory lookup operations.

In some embodiments, the neural network may additionally accommodate the task of object/person re-identification (REID). A teacher-student network distillation approach may be used to train the network to perform such a task. REID embeddings are extracted from object (e.g. human) crops from 2D images using a pre-trained REID network, and these are used as a supervision signal to train a REID branch of the neural network. This branch delivers REID embeddings mimicking those of the teaching network, but can be fully-convolutional, meaning that its running speed is independent of the number of objects in the image.

FIG. 1 shows a schematic overview of an example method 100 for creating a three-dimensional reconstruction of a scene with multiple objects from a single two-dimensional image. The method may be performed by one or more computing devices operating at one or more locations. For example, the method may be performed by a mobile computing device, such as a mobile phone.

One or more 2D images 102, each comprising a plurality of objects 104 of a given type (e.g. people) is input into a neural network 106. In some embodiments, only a single input image 102 is used. The neural network 106 processes the input data to identify objects 104 in the image and generate output data 108 comprising an estimated 3D representation 110 of each (potential) identified object 104 in the input 2D image 102. The output data 108 may, in some embodiments, further comprise estimated coordinates 112 of bounding boxes of the potential objects 104 within the input 2D image 102 and/or probabilities of the presence of objects 104 at locations within the input 2D image 102. The output data 108 is further processed (i.e. post-processed) to generate a three-dimensional reconstruction 116 of the scene in the input 2D image 102. In some embodiments, the output data 108 may further comprise an embedding vector (not shown) associated with each object 104 in the image. The embedding vector provides a REID embedding of the object, so that a given object 104 can be identified and/or tracked across multiple input images 102.

The 2D input image 102, I, comprises a set of pixel values corresponding to a two-dimensional array. For example, in a colour image, $I \in \mathbb{R}^{H \times W \times 3}$, where H is the height of the image in pixels, W is the width of the image in pixels and the image has three colour channels (e.g. RGB or CIELAB). The 2D image may, in some embodiments, be in black-and-white/greyscale.

In some embodiments, the method 100 may use multiple (e.g. a sequence of) input 2D images 102 (for example of a multiple persons moving). The 3D representations 110 may account for these changes. The multiple input 2D images 102 may be received in substantially real time (e.g. at 30 fps), for example from a camera on a mobile device. The neural network 106 may process each of these input 2D images 102 individually, with hidden layer responses for each input 2D image 102 being combined during post-processing when generating the 3D scene.

The neural network 106 takes as input the 2D image 102 and processes it through a plurality of neural network layers to generate the output data 108. The neural network 106 is a deep machine-learning model that includes an output layer and one or more hidden layers that each apply a non-linear transformation to a received input to generate an output. The neural network may predict three-dimensional landmark positions of multiple objects by concatenating feature data from one or more intermediate layers of the neural network. The predicted three-dimensional positions may be estimated simultaneously for the predicted type of object depicted in each region.

Each layer of the neural network 106 comprises a plurality of nodes (also referred to herein as "neurons"), each associated with one or more neural network parameters (e.g. weights and/or biases). Each node takes as input output form one or more nodes in a previous layer (or the input, for the first layer of the neural network) and applies a transformation on its input based on the parameters associated with that node. The transformation may be a non-linear transformation. Some of the nodes may alternatively apply a linear transformation.

The neural network 106 may comprise one or more convolutional layers, each configured to apply one or more convolutional filters to output of a previous layer in the network. In some embodiments, the neural network 106 is fully convolutional. The neural network may comprise one or more fully connected layers, where each node in the fully connected layer receives input from every node in the previous layer. The neural network 106 may comprise one or more skip connections. The neural network 106 may comprise a residual neural network, such as ResNet-50. The residual network may be used as a backbone network.

The neural network 106 may be a single-stage system that jointly detects objects (e.g. humans) and estimates their 3D shape by performing a single forward pass through the neural network 106 (which may be a fully convolutional neural network). Instead of cropping image patches around object detection regions and then processing them again, the task of extracting region-specific features is delegated to neurons of consecutive layers of the neural network 106 with increasingly large receptive fields. A ResNet-50 backbone may be used, which provides an excellent trade-off between speed and accuracy. A-trous convolutions may be used (see for example, L. Chen et al., "*Deeplab: Semantic image segmentation with deep convolutional nets, atrous convolution, and fully connected crfs*", PAMI, 2017. 3, the contents of which are incorporated herein by reference), allowing us to increase the spatial density at which object (e.g. person) hypotheses are evaluated, and can reduce the number of missed detections.

The final layer of the neural network 106 (e.g. fully convolutional neural network) is tasked with predicting output data 108 (e.g. multiple outputs) at each of its neurons, corresponding to the properties of the person hypothesized to be at the respective position.

In some embodiments, one or more of the neural network 106 layers may be a 1×1 convolutional layers. For example, the final layer of the neural network may comprise one or more 1×1 convolutions. Examples of such layers are described in "*Fully Convolutional Networks for Semantic Segmentation*" (E. Shelhamer et al., IEEE Trans. Pattern Anal. Mach. Intell. 39(4): 640-651(2017)) and "*Overfeat: Integrated recognition, localization and detection using convolutional networks*" (P. Sermanet et al., 2nd International Conference on Learning Representations, International Conference on Learning Representations, 2014), the contents of which are hereby incorporated by reference.

The output data 108 comprises a representation of the mesh for each detected object 110. This may be in the form of a K=N×3-dimensional vector capturing the object's shape, where N is the number of nodes in the mesh. N may be 563, though other numbers of mesh nodes are possible. The output data 108 may further comprise a probability of the presence of the object (e.g. person) 114. The output data 108 may further comprise corners of the bounding boxes 112 of objects in the input image 102.

In some embodiments, the predictions of the neural network 106 may be specific to an object type. For example, a neural network 106 may predict 3D positions of facial parts, fingers, and limbs for humans, while a different neural network 106 may be dedicated to wheel, window, door and light positions for cars. It should be appreciated, object landmarks, which are to be expected to be present due to the identified object type, may not be present in the image. For example, if the object type is a human, parts of the human body may not be visible due to posture or other items obstructing the view.

Use of a neural network 106 as described above may result in several advantages. Firstly, inference is efficient, bypassing the need for deconvolution-based decoders for high-accuracy pose estimation. Instead, this architecture is "encoder-only", cutting down the time required to process a M×M (e.g. 233×233) patch to a few milliseconds. Secondly, the resulting networks are easily portable to mobile devices, since they rely exclusively on generic convolutional network layers, as opposed to the rigged body models used in the earlier works. Thirdly, it becomes straightforward to extend the resulting model so that instead of processing individual patches, one can process the entirety of an image in a fully convolutional manner.

Beyond simplicity, the resulting architecture also makes it straightforward to perform temporal smoothing of the reconstructed 3D shapes. Instead of the intricate, parameter tracking-based methods used previously, a running average of the network's 106 penultimate layer activations may be taken. This substantially stabilizes the 3D shapes recovered by the network while requiring practically no effort to incorporate as a processing step in a mobile device.

In some embodiments, the neural network 106 may output the full object mesh, V, of the object (e.g. person) based on a high dimensional feature vector F computed at a position i aligned with a predetermined point in the object (e.g. the sternum of a person). The feature vector may be output by a layer in the neural network, e.g. correspond to the activations of a hidden layer in the network. The mapping may be represented as:

$$V[i]=M(F[i])\qquad(1)$$

where M indicates a mapping the feature vector F to the output mesh, V. M may, in some embodiments, be implemented as a linear layer in the neural network.

The simplicity of this 'centralised' (i.e. aligned with a single predetermined point in the object) method is counteracted by the challenge of counting for all of the details and variations of an object (e.g. human) mesh through F[i], which may act as a bottleneck of the computation. In such a method, the location of a given node in the output mesh 110 may be based on the activations of neurons in the neural network that are associated with positions far away from said mesh node. This can introduce inaccuracies to the resulting output mesh 110.

In some embodiments, a part-based method may alternatively be used to reconstruct the 3D representation 110 of the object. The part based approach uses a distributed approach to mesh regression that can be substantially more accurate than the centralised method. A part based approach is useful in situations where the objects 104 can be divided in parts. For example, the human body can naturally be divided into parts, such as the head, torso, arms, hands etc.

Taking the human body as an example, neurons that are associated with locations close to object parts (e.g. hands, feet etc.) that are distant from the pre-determined point (e.g. sternum) can deliver more reliable estimates for the respective mesh parts than neurons associated with positions further away. These closer neurons act like "distributed part experts" that provide reliable information about the body parts in their vicinity. Information from these distributed part experts can be combined using a coordinator node, located at the pre-determined point (e.g. sternum), to determine the output mesh 110. Information about a particular mesh node associated with a given part that comes from neurons associated with positions further away from said part (i.e. that are not associated with said part) can be suppressed/discarded during determination of the output mesh 110. This may be achieved through the use of a part-level attention matrix, A.

The part positions providing information to the coordinator may be determined by a human skeleton computation stage, associating a sternum position with corresponding part positions. The part positions may be based on, for example joint positions of a human body.

In the part based approach, the neural network 106 outputs a separate part mesh, V[p], for each part, p, of an object 104 in a predetermined list of object parts. Each part mesh, V[p], is provided in its own coordinate system whose origin is offset relative to a reference point (also referred to herein as a "coordinator node"), c, (e.g. the sternum of a human). In other words, $\{p_1, \ldots p_M\}$ represents the positions of each of M parts associated with the coordinator (e.g.

sternum) position, c. Said part positions may be based on key points of the objects, e.g. joint positions in a human body.

To reconstruct the full mesh V from the part meshes V[p], the coordinator selects nodes from V[p] that are pertinent to the part p using a part-level attention matrix A. In some embodiments, A is a binary matrix indicating which part should be used for each vertex in the final mesh, V. For such an attention matrix, the final mesh, V, may be reconstructed for each mesh vertex, v, in the final mesh using:

$$V[c, v] = \sum_{p=1}^{M} [A[:, p](V[p, v] + (c - p))] \quad (2)$$

$$= V[p_v, v] + (c - p_v) \quad (3)$$

where V[c,v] denotes the position of mesh node v relative to the predetermined point, c, $p_v$ indicates the position of the part that is the "active expert" for node v (i.e. the node for which A[p,v]=1 in the binary example), and V[p, v] denotes the position of mesh node v, in the mesh associated with part p. (c−$p_v$) is an offset vector accounting for the relative position between the part and reference position, c (e.g. sternum).

In some embodiments, the part-level attention matrix, A, may be a learned matrix determined during training. In such an example, the position of a given mesh node, v, may be based on information from one or more parts. Using equation (2) may thus result in a weighted sum over more than one part rather than equation (3).

In some embodiments, the output data 108 further comprises estimated coordinates 112 of bounding boxes of the potential objects 104 within the input 2D image 102 and/or probabilities of the presence of objects 104 at locations within the input 2D image 102.

The estimated 3D representation 110 of each (potential) identified object 104 in the input 2D image 102 are, in some embodiments, in the form of an N-vertex mesh, V. For example, the estimated 3D representation 110 of each identified object 104 may be in the form of an (N×3)-dimensional vector giving 3D coordinates of N vertices in the mesh. In some embodiments, N=536, though other number of mesh nodes are possible. The coordinates of bounding boxes may comprise, for each potential object, x and y positions of vertices of the bounding box in the input 2D image 102, e.g. {($x_1$, $y_1$), ($x_2$, $y_2$), ($x_3$, $y_3$), ($x_4$, $y_4$)} for each potential object. Each bounding box may be associated with a corresponding probability that the bounding box contains an object of the given type (e.g. a person).

The 3D reconstruction 116 of the scene in the input 2D image 102 is generated by accounting for perspective projection and undoing its effects when estimating in-world coordinates. The 3D reconstruction 116 is generated by estimating a 3D plane 118 that physically supports the objects 104 (e.g. a floor, the ground) identified in the image 102 (also referred to herein as the "supporting plane") and positioning all 3D objects 110 in space relative to the supporting plane.

Estimating the 3D plane 118 that physically supports the objects 104 identified in the image 102 may be based on the assumption that the objects (e.g. humans) are supported by a single physical plane. In some embodiments, this assumption is relaxed by using mixture models, and using expectation-maximisation to assign different humans to different planes.

Estimating the 3D plane 118 may also be based on assuming that heights of the objects (e.g. humans) are roughly equal. This latter assumption can be relaxed if a sequence of input images 102 are available in which individual objects can be tracked over time and the effects of perspective projection over time on each object monitored.

To position the 3D objects 110 in space relative to the supporting plane, a scaling is estimated of each mesh in order to bring it to the world-coordinates. The scale is inversely proportional to the distance of an object (e.g. person) from the camera capturing the scene in the input image 102. As such, the scaling can be used to position the mesh in world coordinates along a line connecting the mesh vertices to the camera centre.

As an example, the 3D objects 110 may be provided by the neural network 106 in the form of meshes estimated under orthographic projection. Given the i-th mesh in a scene with vertices $m_i = \{v_{i,1}, \ldots, v_{i,K}\}$, where $v_{i,k} = (x_{i,k}, y_{i,k}, z_{i,k}) \in R^3$ are the mesh coordinates estimated under scaled orthography, and scale $s_i$, the mesh vertices are positioned in 3D world coordinates by undoing the effects of perspective projection. For example, the world coordinates of the k-th point in the i-th mesh, $V_{i,k} = (X_{i,k}, Y_{i,k}, Z_{i,k})$, can be estimated from corresponding mesh coordinates estimated under scaled orthography by "pushing back" the mesh depth in world coordinates by the inverse of the scale factor, and setting the X and Y world coordinates so that they correctly project back to corresponding pixel-coordinate values of x and y. Symbolically, this may be represented as:

$$Z_{i,k} = z_{i,k} + \frac{1}{s_i} \quad (4)$$

$$X_{i,k} = Z_{i,k} \frac{x_{i,k} - c_x}{f} \quad (5)$$

$$Y_{i,k} = Z_{i,k} \frac{y_{i,k} - c_y}{f} \quad (6)$$

where a camera calibration matrix with centre $c_x = W/2$ and $c_y = H/2$ (where W and H are the image dimensions, i.e. image width and height), and focal length f. These can be set manually or by camera calibration.

For each mesh corresponding to an identified object, the lowest (i.e. lowest Y value) is determined and used to estimate a point of contact between the object and a supporting plane (e.g. floor). Once at least four of such points have been determined (collectively denoted M), the determined points can be used to estimate the supporting plane in world coordinates. In some embodiments, a least-squares method can be used to estimate the plane in world coordinates, e.g.:

$$(a, b, c, d) = \operatorname{argmin}_{a,b,c,d} \sum_{i,k \in M} (aX_{i,k} + bY_{i,k} + cZ_{i,k} + d) \quad (7)$$

where $V_1 = (a, b, c)$ is a vector normal to the supporting plane. This vector may, in some embodiments, be normalised. World coordinate axes, $R = [v_1^T, v_2^T, v_3^T]^T$, are them defined by finding two complementary directions, $V_2$ and $V_3$, that are orthogonal to both V, and each other. In some embodiments, $V_2$ is chosen to be in the direction of Z and $V_3 = V_1 \times V_2$. The vectors $V_2$ and $V_3$ may, in some embodiments, be normalised, i.e. the set $\{V_1, V_2, V_3\}$ forms an orthonormal basis.

A world coordinate centre, T, may also be assigned as a 3D point lying on the plane. For example, this can be set to be a point that is three meters from the camera, and projects to y=H/2.

The above can, in some embodiments, be used to define a transformation between the world coordinate system and the pixel positions in the 2D image 102. The world-to-camera transformation and the camera calibration matrix in a single 3×4 perspective projection matrix, P. For example, may be given by:

$$P = \begin{bmatrix} f & 0 & c_x \\ 0 & f & c_y \\ 0 & 0 & 1 \end{bmatrix} \begin{bmatrix} V_1 & V_2 & V_3 & -C \\ 0 & 0 & 0 & 1 \end{bmatrix} \qquad (8)$$

Here, the direction, V, vectors appear as rows rather than columns since the inverse rotation matrix is being used, and $R^{-1}=R^T$.

Using homogenous coordinates, world coordinates, C, can be translated to pixel coordinates, c, using:

$$c = PC, \text{ where } C = \begin{bmatrix} X \\ Y \\ Z \\ 1 \end{bmatrix} \text{ and } c = \begin{bmatrix} x \\ y \\ 1 \end{bmatrix}. \qquad (9)$$

The coordinate transformation can, in some embodiments, be used to introduce objects to a scene/image that respect the laws of physics and/or interact with other objects in a meaningful/realistic way. This can lead to interactive applications requiring real world coordinates, e.g. augmented reality games, such as games where a player tries to hit another with a sword or a laser beam. In some embodiments, the 3D reconstructed meshes can be projected back to the input image 102, showing the accuracy of the 3D human pose estimates.

In embodiments where multiple input 2D images 102 are used, estimating the plane supporting multiple may be performed for a sequence of frames using relative camera pose estimation and plane localization using correspondences between points of consecutive frames. The processing (e.g. post-processing) may take place over multiple consecutive frames by combining the hidden layer responses at consecutive frames for example by averaging them.

According to some of the example embodiments, the synthetic objects can be controlled by the objects in the input image (e.g. people), or interact with them. For example, an added synthetic object can be a sword, or a laser beam that a person is controlling with his arm in a computer game—or an object that is moving towards a person and bouncing back when contacting the estimated three-dimensional person position.

The method may be integrated into a graphics engine, such as Unity. Users can interact in real-time with images/video of themselves and/or see the meshes super-imposed on themselves.

Combining multiple measurements over time taken from consecutive input images 102, e.g. in a video, gives further improved estimates, while combining the methods with camera tracking, as in Simultaneous Localization And Mapping (SLAM) allows For the combination deformable objects, like humans, with rigid 3D scenes, both reconstructed in metric coordinates.

Figure 2:
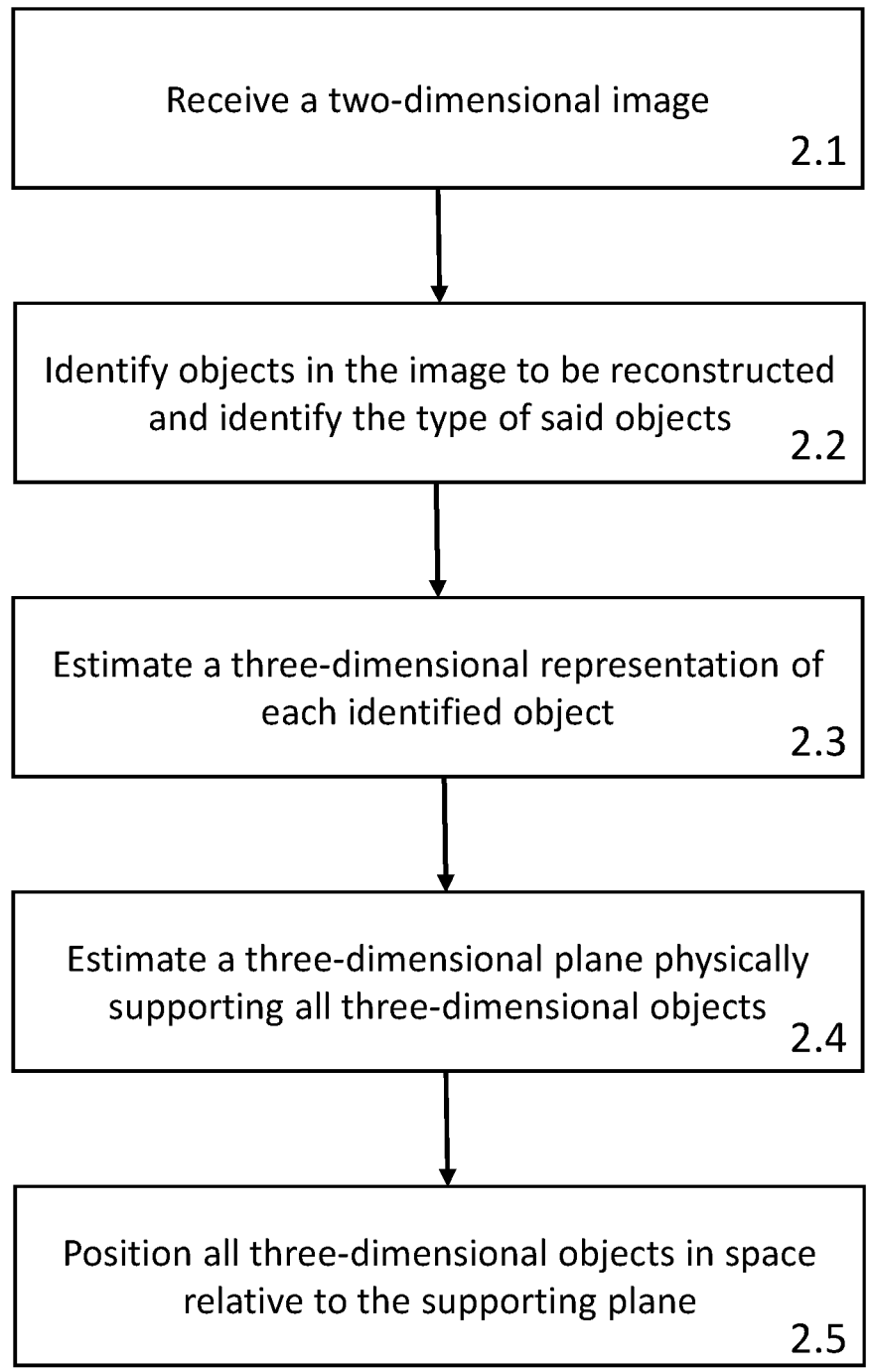
FIG. 2 shows a flow diagram of a method for creating a three-dimensional reconstruction of a scene with multiple objects from a single two-dimensional image.

FIG. 2 shows a flow diagram of an example method for creating a three-dimensional reconstruction of a scene with multiple objects from a single two-dimensional image.

The method may be performed by one or more computers operating at one or more locations. The method may correspond to the method described in relation to FIG. 1.

At operation 2.1, a 2D image is received. The 2D image comprises an array of pixel values, e.g. an RGB image. A single 2D input image may be received. In some embodiments, a sequence of single images may be received.

At operation 2.2, objects in the image to be reconstructed are identified. Object types may also be identified. Operation 2.2 may be performed by one or more layers of a neural network, such as the neural network described above in relation to FIG. 1.

At operation 2.3, a 3D representation of each identified object is estimated. The 3D representation may be in the form of mesh, e.g. a K=N×3 dimensional vector of N vertex locations in 3D. Operation 7.3 may be performed by one or more layers of a neural network, such as the neural network described above in relation to FIG. 1.

The operation of estimating the 3D representation may be performed in a deep machine-learning model, e.g. a neural network, which includes an output layer and one or more hidden layers that each apply a non-linear transformation to a received input to generate an output. The deep machine-learning model may predict 3D landmark positions of multiple objects by concatenating feature data from one or more intermediate layers of the neural network. The predicted 3D positions are estimated simultaneously for the predicted type of object depicted in each region.

Where a sequence of input images are received, estimating the three-dimensional representations of multiple objects and positioning them on a plane is performed for each received image. If the images are received in substantially real time (e.g. 30 fps), these operations may be performed in substantially real time.

At operation 2.4, a 3D plane physically supporting all three-dimensional objects is estimated. Operation 2.4 may be performed in a post-processing step, i.e. after the processing of the input image by the neural network. Methods of estimating the supporting frame are described on further detail above with reference to FIG. 1.

Estimating the plane supporting multiple objects may be performed for a single frame by using the estimated three-dimensional positions of all visible objects to reconstruct the two-dimensional plane that passes through them. For example, the supporting plane may be estimated based on the estimated locations of contact points between the objects and the plane, e.g. the positions of feet of the persons identified in the input image. Estimating the plane supporting multiple objects may be performed for a sequence of frames using relative camera pose estimation and plane localization using correspondences between points of consecutive frames.

At operation 2.5, the 3D objects are positioned in space relative to the supporting plane. Operation 2.5 may be performed in a post-processing step, i.e. after the processing of the input image by the neural network. Methods of positioning the 3D objects relative to the supporting frame are described on further detail above with reference to FIG. 1.

Figure 3:
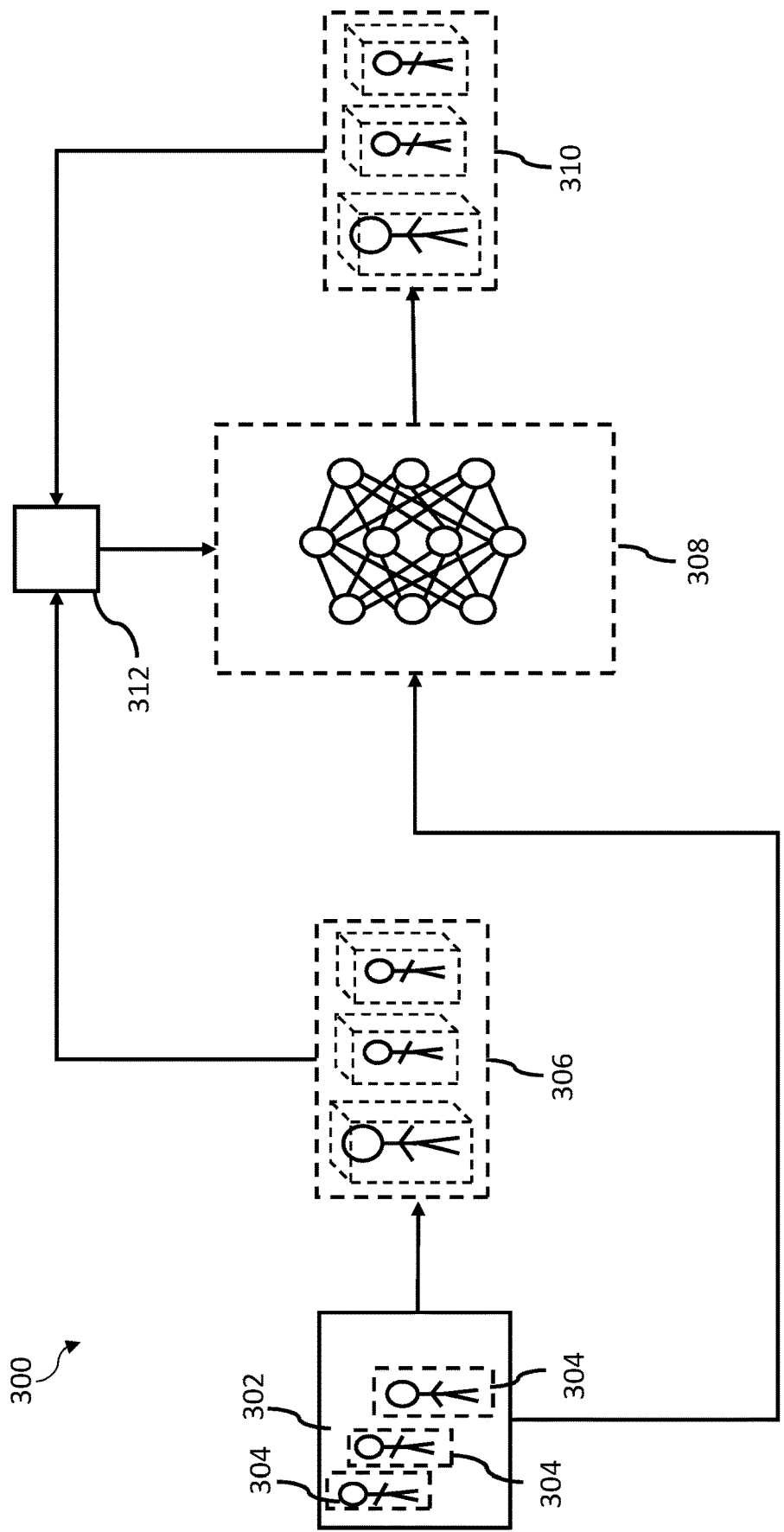
FIG. 3 shows a schematic overview of an example method for training a neural network to reconstruct a three-dimensional scene with multiple objects from a single two-dimensional image.

FIG. 3 shows a schematic overview of an example method 300 for training a neural network to reconstruct a three-dimensional scene with multiple objects from a single two-dimensional image. The method may be performed by one or more computers operating at one or more locations.

A 2D training image 302 is obtained from a training dataset comprising a plurality of 2D images. The 2D images comprises one or more objects 304 of a given type (e.g. one or more humans). A 3D deformable model is fitted (e.g. iteratively fitted) to objects in the input image 302 to extract one or more supervision signals 306 for the monocular 3D reconstruction. The training image 302 is input into a neural network 308 and processed through a series of neural network layers using current parameters of the neural network 308 to generate output data 310 comprising candidate 3D representations of each (prospective) object in the input training image 302. The output data is compared to the supervision signals 306 of the input image 302 to determine parameter updates 312 for the neural network 308.

The method may be performed iteratively until a threshold condition is satisfied.

The input images 302 and the neural network 308 may be in the same form as described in relation to FIG. 1.

During the deformable model fitting/optimization stage all of the available 2D and 3D ground-truth data is used to provide energy terms that are be minimized to obtain the estimated 3D shape (i.e. the supervision signal 306). As an example, the method described in "*Holopose: Holistic 3d human reconstruction in-the-wild*" (R. Alp Guler and I. Kokkinos, In The IEEE Conference on Computer Vision and Pattern Recognition (CVPR), June 2019. 2, 3, the contents of which are incorporated herein by reference) using CNN-powered iterative fitting of deformable models to 2D images may be used.

The step of fitting the three-dimensional model may be performed by projecting a three-dimensional representation on to a two-dimensional image plane resulting in a projected representation. The step of projecting may be performed by taking into account the effects of perspective projection and by exploiting multiple views of the same object, if multiple views are available. This may then be compared respective positions of the projected representation with the object in the single two-dimensional image and an error value determined based on comparison, e.g. by determining a difference in object landmark positions in the training image 302 and the re-projected image. Parameters of the fused three-dimensional representation are then adjusted based on the error value. The projection, comparing, measuring and adjusting may be repeated iteratively until the measured error value is below a predetermined threshold value or a threshold number of iterations is surpassed.

Once the deformable model fitting converges, the estimated 3D surface is used as the target, or supervision signal 306 for network 308 training. For example, a "low-poly" representation of the objects 304 (e.g. human bodies), representing the mesh in terms of N (e.g. N=536) vertices that cover significant object (e.g. humano landmarks (e.g. facial parts, limb junctions etc.).

From the fittings of the deformable model to an image, the estimated 3D positions of those vertices around each object present in the image are measured. The neural network 308 is then trained to regress this K=N×3-dimensional vector when presented with an object 304 in its receptive field. In the presence of multiple objects, different responses are expected in different image positions. The locations of bounding boxes of objects in the input image 302 and/or the presence/absence of objects at locations in the input image may additionally be used as supervision signals 306.

The task of extracting region-specific features to neurons of consecutive layers with increasingly large receptive fields. A ResNet-50 backbone may be used, which has an excellent trade-off of speed and accuracy. A-trous convolutions can be used, allowing an increase in the spatial density at which person hypotheses are evaluated, and a reduction in the number of missed detections. The final layer of the resulting fully-convolutional layer is tasked with predicting multiple outputs at each of its neurons, corresponding to the properties of the person hypothesized to be at the respective position. In some embodiments, the output data 310 further comprises the probability of the presence of the object (e.g. person). Corners of the object bounding box may also be regressed and form part of the output data 310.

The comparison of the output data to the supervision signals 306 of the input image 302 may be performed using a loss/objective function, L. The loss function comprises terms that penalises differences between the candidate 3D representation and the 3D representation in the supervision signal 306. Many examples of such a loss function are known in the art, such as L1 or L2 losses. The loss function may also comprise terms that penalise differences in the location of candidate bounding boxes output by the neural network 308 and ground-truth bounding box positions in the input training image 302. Many examples of such a loss function are known in the art, such as L1 or L2 losses. The loss function may also comprise terms that penalise output probabilities of the neural network 308 based on the actual presence/absence of objects at that location. Many examples of such a loss function are known in the art, such as classification loss functions.

In some embodiments, the loss may only penalizes the 3D representation and the bounding box location in the presence of objects (e.g. persons)—it is understood that in the absence of objects the box and 3D shape can take arbitrary values, but the object detector will prune the resulting hypotheses.

The parameter updates 312 may be determined by applying an optimisation procedure to the loss/objective function, such as stochastic gradient descent. The loss function may be averaged over a batch of training images before determining each set of parameter updates. The process may be iterated over a plurality of batches in the training dataset.

In embodiments where a part-based approach to mesh estimation is used, the 3D representations in the supervision signal 306 may each be divided up into parts. The division of each supervision signal 306 into parts may be based on key points of the object 304. For example, the supervision signal 306 may be divided into body parts (e.g. hands, feet etc.) based on joint positions. Part meshes, V[p], output by the neural network 308 are compared to corresponding part meshes in the supervision signal 306 when determining the parameter updates 312.

Figure 4:
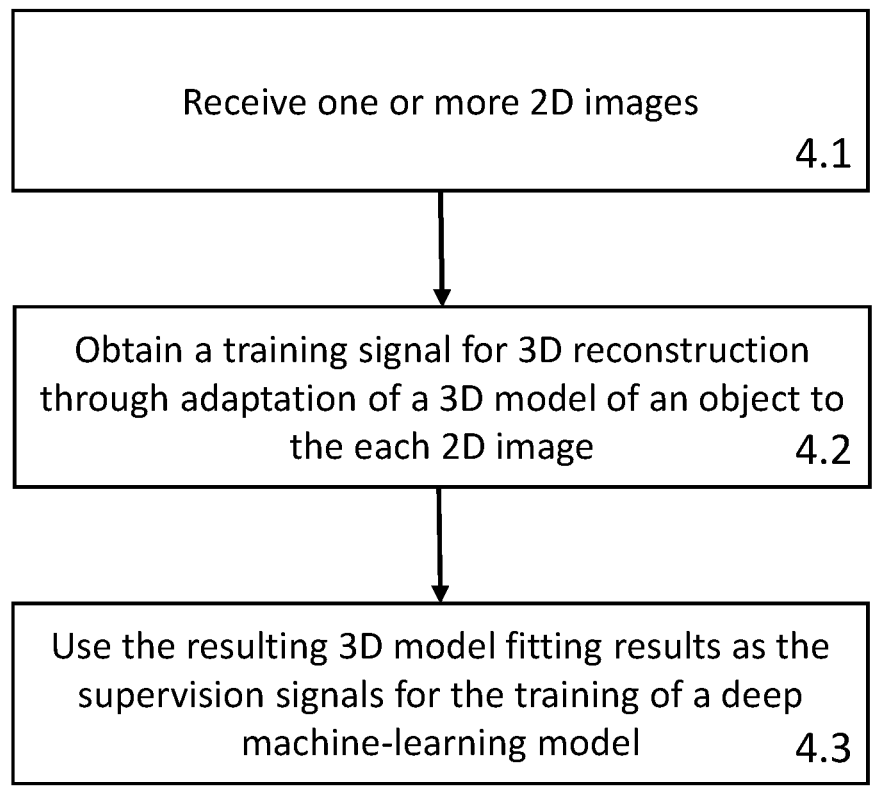
FIG. 4 shows a flow diagram of a method for training a neural network for use in reconstructing a three-dimensional scene with multiple objects from a single two-dimensional image.

FIG. 4 shows a flow diagram of a method for training a neural network for use in reconstructing a three-dimensional scene with multiple objects from a single two-dimensional image. The method may be performed by one or more computers operating at one or more locations. The method may correspond to the training method described with reference to FIG. 3.

At operation 4.1, a one or more two-dimensional images are received. The 2D images may be in the form of the image described with reference to FIG. 1. Each 2D image comprises one or more objects of a given type (e.g. humans).

At operation 4.2, a training signal for three-dimensional reconstruction is obtained through adaptation of a three-dimensional model of an object to each two-dimensional image. This effectively generates a labelled training dataset comprising a plurality of 2D images, each associated with one or more 3D representations of objects (e.g. humans) within the images.

Fitting the three-dimensional model may be performed by projecting a three-dimensional representation on to a two-dimensional image plane, resulting in a projected representation; comparing respective positions of the projected representation with the object in the single two-dimensional image; measuring an error value based on comparing; and adjusting parameters of the fused three-dimensional representation based on the error value, wherein the comparing, measuring and adjusting are repeated iteratively until a threshold condition is satisfied. The threshold condition may be the measured error value falling below a predetermined threshold value and/or a threshold number of iterations being surpassed. The step of projecting may be performed by taking into account the effects of perspective projection and by exploiting multiple views of the same object, if multiple views are available.

At operation 4.3, the resulting three-dimensional model fitting results are used as the supervision signals for the training of the deep machine-learning model. The deep machine-leaning model may be trained as described above in relation to FIG. 3.

Figure 5:
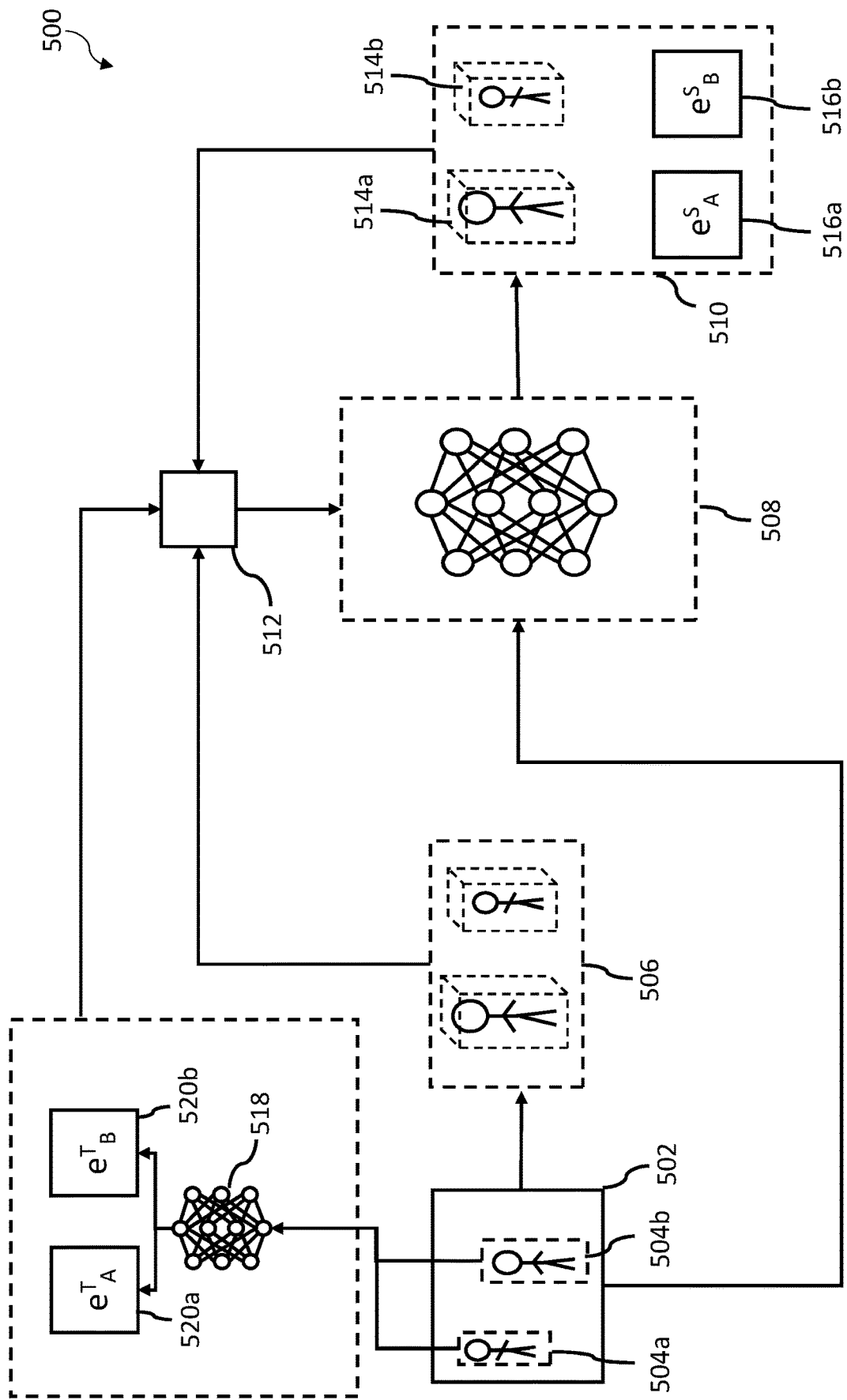
FIG. 5 shows a further example of a method for training a neural network for use in reconstructing a three-dimensional scene and object re-identification.

FIG. 5 shows a further example of a method 500 for training a neural network for use in reconstructing a three-dimensional scene and object re-identification. The method may be performed by one or more computers operating at one or more locations. The method 500 is an extension of the method shown and described above in relation to FIG. 3 to include the training of a branch of the neural network 508 to output one or more re-identification (REID) embedding vectors 516a, 516b as an additional part of the output data 510. As such, any of the features described in relation to FIG. 3 may additionally be combined with the features described in relation to FIG. 5. A neural network 508 trained according to the methods described in relation to FIG. 5 is endowed with the ability to maintain object/person identity over a sequence of images. This can be critical for object/person-specific parameter smoothing and accumulation of information over time—as well as for video game experiences, where every user is consistently associated with a unique character over time.

Person/object re-identification is usually addressed in the literature through two-stage architectures, where persons/objects are first detected by a person/object detection system, and, for every detected person/object, an image is cropped and sent as input to a separate person identification network. The latter provides a high-dimensional embedding, that acts like a discriminative person/object signature that is trained to be invariant to nuisance parameters, such as camera position, person/object pose, illumination etc. This strategy has a complexity that scales linearly in the number of persons, and is also hard to implement on mobile devices, being two-stage.

Instead, the neural networks described in relation to FIGS. 1-4 can be extended to accommodate the task of object/person re-identification (REID) using a teacher-student network distillation approach. REID embeddings are extracted from object/human crops using a pre-trained REID network. These REID embeddings are used as a supervision signal to train a REID branch for the neural network. This branch delivers REID embeddings mimicking those of the teaching network, but may, for example, be fully-convolutional, meaning that its running speed is independent of the number of objects.

Combining a network trained in such a way with a re-identification and tracking algorithm allows object/person identities to be maintained in scenes with high person overlap, interactions, and occlusions, even in cases where the users disappear momentarily from the scene. Examples of such re-identification and tracking algorithms can be found in "*Memory based online learning of deep representations from video streams*" (F. Pernici et al., CVPR 2018, Salt Lake City, UT, USA, Jun. 18-22, 2018, pages 2324-2334), the contents of which are hereby incorporated by reference. Maintenance of object/person identification across multiple images in a scene can allow for different virtual objects/skins to be persistently associated with each object/person in the images across time.

A 2D training image 502 is obtained from a training dataset comprising a plurality of 2D images. The 2D images comprises one or more objects 504a, 504b (in the example shown, two objects 504a, 504b, though in general any number of objects may be present) of a given type (e.g. humans). A 3D deformable model is fitted (e.g. iteratively fitted) to objects in the input image 502 to extract one or more supervision signals 506 for the monocular 3D reconstruction. In addition, each object 504a, 504b is cropped from the image (e.g. using the ground-truth bounding box for the object) and separately input into a pre-trained REID network 518. The pre-trained REID network 518 processes the crop of each input object 504a, 504b to generate a "teacher" re-identification embedding 520a, 520b (denoted $e^T_i$ for object i in the input image 502) that encodes the identity of the input object 504a, 504b. The teacher re-identification embeddings, $e^T_i$, 520a, 520b are used as supervision signals for training a re-identification branch of the neural network 508.

The training image 502 is input into a neural network 508 and processed through a series of neural network layers using current parameters of the neural network 508 to generate output data 510 comprising candidate 3D representations 514a, 514b of each (prospective) object in the input training image 502 and a "student" re-identification embedding 516a, 516b of each (prospective) object in the input training image 502. The output data 510 is compared to the supervision signals 506 of the input image 502 and the teacher embeddings 520a, 520b to determine the parameter updates 512 for the neural network 508.

The teacher REID embeddings 520a, 520b and student REID embeddings 516a, 516b are each high-dimensional vectors representing an individual object's identity. For example, each REID embedding may be an N-dimensional vector. N may be, for example, 256,512 or 1024.

Where a loss/objective function is used to determine the parameter updates 512, the loss/objective function may comprise a re-identification loss that compares each teacher REID embedding 520a, 520b to its corresponding student REID embedding 516a, 516b. The re-embedding loss may be an L1 or L2 loss between each teacher REID embedding 520a, 520b and its corresponding student REID embedding 516a, 516b.

Figure 6:
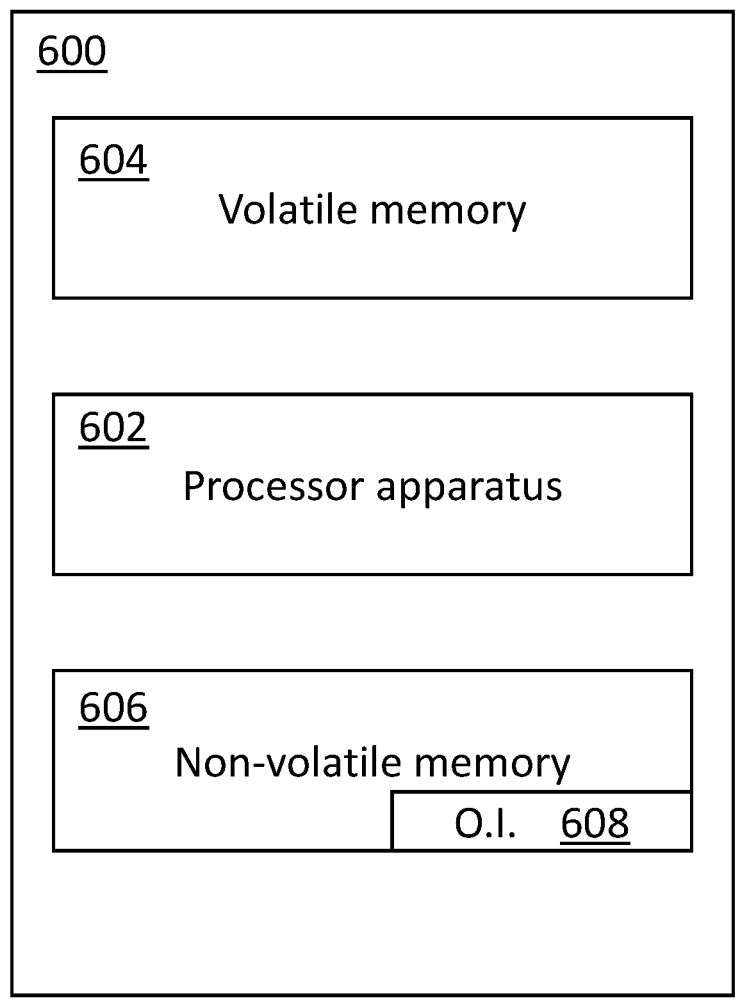
FIG. 6 shows a schematic example of a system/apparatus for performing any of the methods described herein.

FIG. 6 shows a schematic example of a system/apparatus for performing any of the methods described herein. The system/apparatus shown is an example of a computing device. It will be appreciated by the skilled person that other types of computing devices/systems may alternatively be used to implement the methods described herein, such as a distributed computing system. One or more of these systems/apparatus may be used to perform the methods described herein. For example, a first computing device (e.g. a mobile computing device) may be used to perform the method described above in relation to FIGS. 1 and 2, and/or a second computing device may be used to perform the method described above in relation to FIGS. 3 to 5. The model used in the first computational unit may have been trained using the second computational unit.

The apparatus (or system) 600 comprises one or more processors 602. The one or more processors control operation of other components of the system/apparatus 600. The one or more processors 602 may, for example, comprise a general-purpose processor. The one or more processors 602 may be a single core device or a multiple core device. The one or more processors 602 may comprise a Central Processing Unit (CPU) or a Graphical Processing Unit (GPU). Alternatively, the one or more processors 602 may comprise specialised processing hardware, for instance a RISC processor or programmable hardware with embedded firmware. Multiple processors may be included.

The system/apparatus comprises a working or volatile memory 604. The one or more processors may access the volatile memory 604 in order to process data and may control the storage of data in memory. The volatile memory 604 may comprise RAM of any type, for example, Static RAM (SRAM), Dynamic RAM (DRAM), or it may comprise Flash memory, such as an SD-Card.

The system/apparatus comprises a non-volatile memory 606. The non-volatile memory 606 stores a set of operation instructions 608 for controlling the operation of the processors 602 in the form of computer readable instructions. The non-volatile memory 606 may be a memory of any kind such as a Read Only Memory (ROM), a Flash memory or a magnetic drive memory.

The one or more processors 602 are configured to execute operating instructions 608 to cause the system/apparatus to perform any of the methods described herein. The operating instructions 608 may comprise code (i.e. drivers) relating to the hardware components of the system/apparatus 600, as well as code relating to the basic operation of the system/apparatus 600. Generally speaking, the one or more processors 602 execute one or more instructions of the operating instructions 608, which are stored permanently or semi-permanently in the non-volatile memory 606, using the volatile memory 604 to store temporarily data generated during execution of said operating instructions 608.

Implementations of the methods described herein may be realised as in digital electronic circuitry, integrated circuitry, specially designed ASICs (application specific integrated circuits), computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 6, cause the computer to perform one or more of the methods described herein.

Any system feature as described herein may also be provided as a method feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims.

The various example embodiments described herein are described in the general context of method steps or processes, which may be implemented in one aspect by a computer program product, embodied in a computer-readable medium, including computer-executable instructions, such as program code, executed by computers in networked environments. A computer readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps may be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the example embodiments presented herein.

The invention claimed is:

1. A method for creating a three-dimensional reconstruction of a scene with multiple objects from a single two-dimensional image, the method comprising:
   receiving the single two-dimensional image comprising a representation of the scene with the multiple objects;
   identifying the multiple objects in the single two-dimensional image to be reconstructed and identifying types of the multiple objects;
   estimating a three-dimensional representation of each identified object using a deep machine learning model;
   estimating a three-dimensional plane physically supporting the multiple objects based on three-dimensional positions of the three-dimensional representation;
   reconstructing the three-dimensional plane that passes through the three-dimensional positions;
   fitting the three-dimensional plane in the single two-dimensional image;
   measuring an error value based on comparing the three-dimensional plane with a two-dimensional plane shown in the single two-dimensional image;

adjusting the three-dimensional plane based on the error value, wherein the fitting, measuring, and adjusting are repeated iteratively until a threshold condition is satisfied; and displaying, on a display of a computing device, the three-dimensional representation of the each identified object relative to the two-dimensional plane.

2. The method of claim 1, wherein the deep machine learning model includes an output layer and one or more hidden layers that each apply a non-linear transformation to a received input to generate an output.

3. The method of claim 2, wherein the deep machine learning model predicts three-dimensional landmark positions of multiple objects by concatenating feature data from one or more intermediate layers of a neural network and the predicted three-dimensional landmark positions are estimated simultaneously for a predicted type of object depicted in each region.

4. The method of claim 1, wherein the estimating the three-dimensional plane supporting the multiple objects is performed for a sequence of frames using relative camera pose estimation and plane localization using correspondences between points of consecutive frames.

5. The method of claim 1, further comprising receiving a plurality of images, wherein the estimating the three-dimensional representations of the multiple objects and displaying the three-dimensional representations relative to the three-dimensional plane are done for each received image in real-time.

6. The method of claim 5, wherein the deep machine learning model comprises one or more hidden layers, and the method further comprises combining hidden layer responses at consecutive frames by averaging the hidden layer responses.

7. The method of claim 1, wherein digital graphics objects are synthetically added to the three-dimensional reconstruction of the scene, in a given relation to the three-dimensional positions, and then projected back to the single two-dimensional image.

8. A system for creating a three-dimensional reconstruction of a scene with multiple objects from a single two-dimensional image, the system comprising a memory; and at least one processor, wherein the at least one processor is configured to perform operations comprising:

receiving the single two-dimensional image comprising a representation of the scene with the multiple objects;

identifying the multiple objects in the single two-dimensional image to be reconstructed and identifying types of the multiple objects;

estimating a three-dimensional representation of each identified object using a deep machine learning model;

estimating a three-dimensional plane physically supporting the multiple objects based on three-dimensional positions of the three-dimensional representation;

reconstructing the three-dimensional plane that passes through the three-dimensional positions;

fitting the three-dimensional plane in the single two-dimensional image;

measuring an error value based on comparing the three-dimensional plane with a two-dimensional plane shown in the single two-dimensional image;

adjusting the three-dimensional plane based on the error value, wherein the fitting, measuring, and adjusting are repeated iteratively until a threshold condition is satisfied; and displaying, on a display of a computing device, the three-dimensional representation of the each identified object relative to the two-dimensional plane.

9. A computer readable medium that stores a set of instructions that is executable by at least one processor for creating a three-dimensional reconstruction of a scene with multiple objects from a single two-dimensional image, to cause the at least one processor to perform operations comprising:

receiving the single two-dimensional image comprising a representation of the scene with multiple objects;

identifying the multiple objects in the single two-dimensional image to be reconstructed and identifying types of the multiple objects;

estimating a three-dimensional representation of each identified object using a deep machine learning model;

estimating a three-dimensional plane physically supporting the multiple objects based on three-dimensional positions of the three-dimensional representation;

reconstructing the three-dimensional plane that passes through the three-dimensional positions;

fitting the three-dimensional plane in the single two-dimensional image;

measuring an error value based on comparing the three-dimensional plane with a two-dimensional plane shown in the single two-dimensional image;

adjusting the three-dimensional plane based on the error value, wherein the fitting, measuring, and adjusting are repeated iteratively until a threshold condition is satisfied; and displaying, on a display of a computing device, the three-dimensional representation of the each identified object relative to the two-dimensional plane.

10. The system of claim 8, wherein the operations further comprising:

obtaining a training signal for the three-dimensional reconstruction through adaptation of a three-dimensional model of an object to the single two-dimensional image using three-dimensional model fitting results of the three-dimensional model as a supervision signal for the training of the deep machine learning model.

11. The system of claim 10, wherein the error value being a first error value; and the operations further comprise fitting the three-dimensional model by projecting the three-dimensional representation on a two-dimensional image plane resulting in a projected representation;

comparing respective positions of the projected representation with the object in the single two-dimensional image;

measuring a second error value based on comparing; and adjusting parameters of a fused three-dimensional representation based on the second error value, wherein the comparing, measuring, and adjusting are repeated iteratively until the second error value is below a predetermined threshold value or a threshold number of iterations is surpassed.

12. The system of claim 11, wherein the projecting the three-dimensional representation on the two-dimensional image plane is performed based on effects of perspective projection and by exploiting multiple views of a same object.

13. The system of claim 8, wherein the estimating the three-dimensional representation is performed in the deep machine learning model that includes an output layer and one or more hidden layers that each apply a non-linear transformation to a received input to generate an output.

14. The system of claim 13, wherein the deep machine learning model predicts three-dimensional landmark positions of the multiple objects by concatenating feature data from one or more intermediate layers of a neural network and predicted three-dimensional positions are estimated simultaneously for a predicted type of object depicted in each region.

15. The system claim 8, wherein the estimating the three-dimensional plane supporting the multiple objects is performed for a sequence of frames using relative camera pose estimation and plane localization using correspondences between points of consecutive frames.

* * * * *

UNITED STATES PATENT AND TRADEMARK OFFICE
CERTIFICATE OF CORRECTION

PATENT NO. : 12,169,975 B2  
APPLICATION NO. : 17/596697  
DATED : December 17, 2024  
INVENTOR(S) : Guler et al.

Page 1 of 1

It is certified that error appears in the above-identified patent and that said Letters Patent is hereby corrected as shown below:

In the Claims

In Column 21, Line 8, in Claim 15, after "system", insert --of--

Signed and Sealed this  
Fourth Day of November, 2025

John A. Squires  
*Director of the United States Patent and Trademark Office*